Aug. 24, 1937.  N. H. GUSTAFSON  2,090,838
DEVICE FOR USE IN TRUING WHEELS AND BRAKE DRUMS
Filed Nov. 20, 1936  2 Sheets-Sheet 1
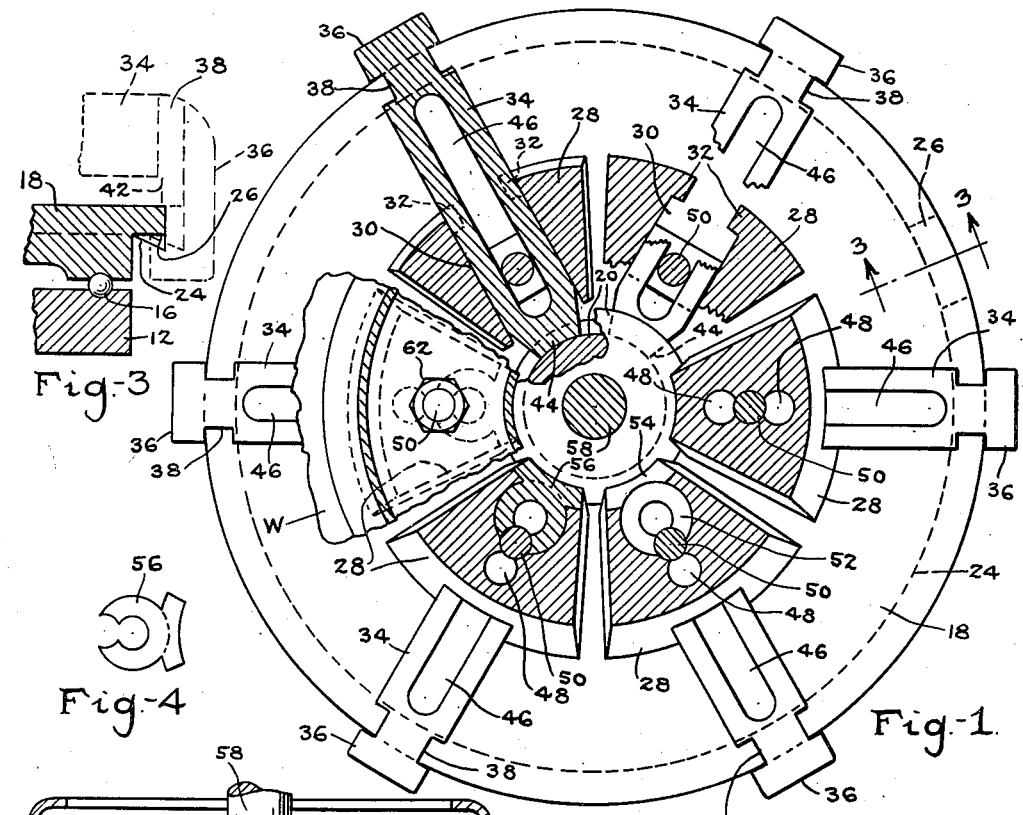
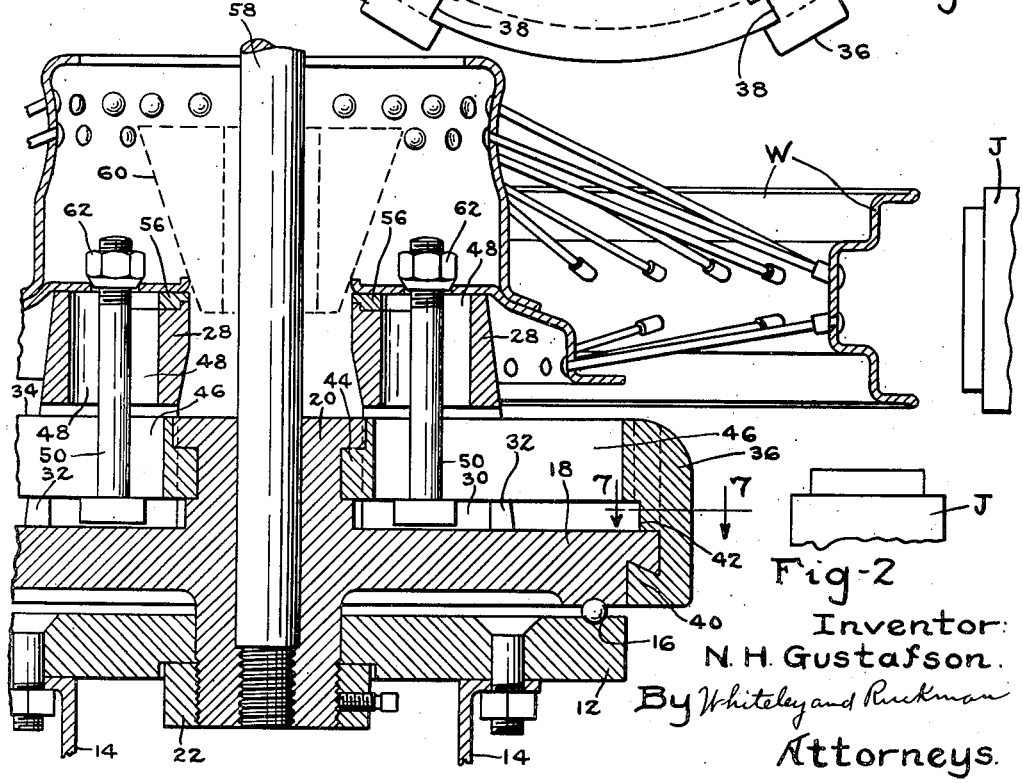
Inventor:
N. H. Gustafson.
By Whiteley and Ruckman
Attorneys.

Aug. 24, 1937.   N. H. GUSTAFSON   2,090,838
DEVICE FOR USE IN TRUING WHEELS AND BRAKE DRUMS
Filed Nov. 20, 1936   2 Sheets-Sheet 2
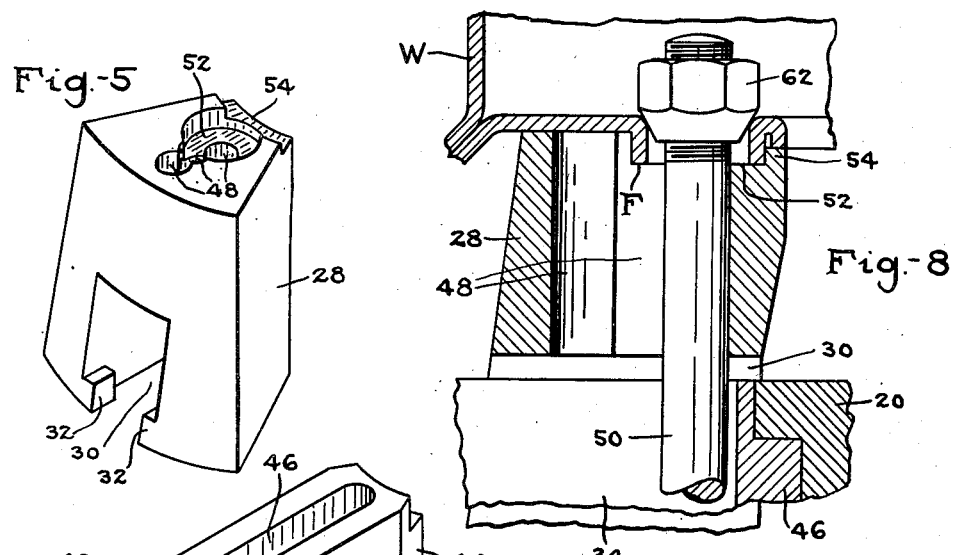
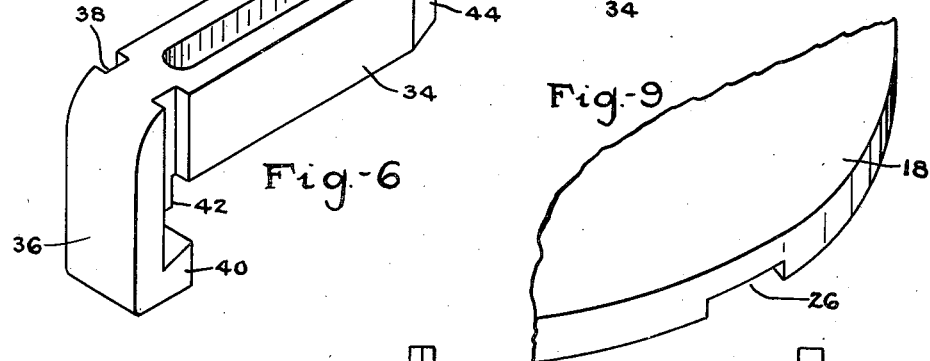
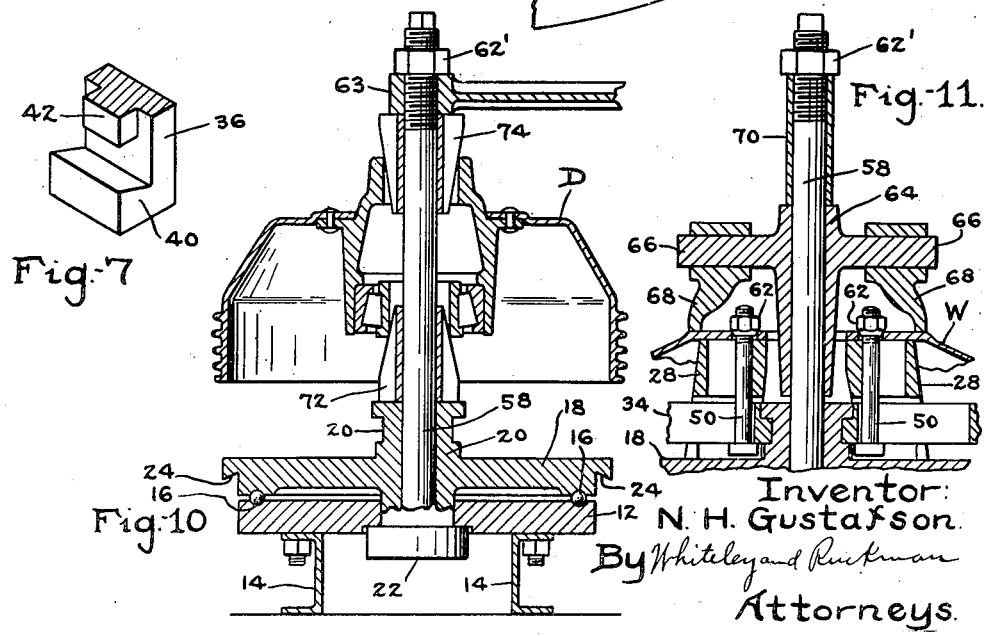
Inventor:
N. H. Gustafson.
By Whiteley and Ruckman
Attorneys.

Patented Aug. 24, 1937

2,090,838

UNITED STATES PATENT OFFICE 2,090,838

DEVICE FOR USE IN TRUING WHEELS AND BRAKE DRUMS

Nestor H. Gustafson, Minneapolis, Minn.

Application November 20, 1936, Serial No. 111,859

5 Claims. (Cl. 144—288)

My invention relates to devices for use in truing wheels and brake drums. It relates more particularly to devices for holding wheels and brake drums after they have been removed from the vehicle so that they may be trued and straightened. An object of the invention is to provide a device of this character which is so constructed that it is adapted for use with various types and makes of wheels and brake drums whereby it becomes unnecessary to provide different devices for use with different makes of motor vehicles. The device is, therefore, a universal device. Another object is to provide a device of this character in which the wheel or drum is rotatably held so that after being worked upon, the accuracy of the truing operation may be readily tested by spinning or rapidly rotating the wheel or drum.

The novel features which I believe to be characteristic of my invention are set forth with particularity in the appended claims. The invention itself, however, both as to its organization and method of operation, together with additional objects and advantages thereof will be best understood from the following description of specific embodiments when read in connection with the accompanying drawings in which,—

Fig. 1 is a plan view of the device partly in horizontal section.

Fig. 2 is a view in vertical section showing a wheel applied for truing.

Fig. 3 is a view in vertical section on the line 3—3 of Fig. 1.

Fig. 4 is a plan view of a filler member.

Fig. 5 (Sheet 2) is a perspective view of one of the blocks which I employ.

Fig. 6 is a perspective view of one of the arm members which I employ.

Fig. 7 is a sectional perspective view, the section being taken on the line 7—7 of Fig. 2.

Fig. 8 is a fragmentary sectional view showing the device applied for use with wheels having circular ribs or flanges around the bolt holes.

Fig. 9 is a fragmentary perspective view of a face plate constituting part of the device.

Fig. 10 is a vertical sectional view showing the device adapted for use with brake drums.

Fig. 11 is a view in vertical section showing the device adapted for use with disk wheels.

As shown in the drawings, I provide a base member 12 which is secured as by bolts to a suitable support or frame 14. The base 12 carries a circular row of ball bearings 16 which rotatably support a face plate 18 having a collar 20 at its center extending down through the open center of the base and having a nut 22 on its lower end to hold the base and the plate 18 together. The periphery of the plate 18 is formed with a trackway. In the form shown, the underside of the plate is undercut to provide a circular groove 24 which in one place in the periphery is provided with an entrance slot 26 as will be understood from Figs. 1, 3, and 9. For cooperation with the face plate, I provide a plurality of blocks 28, the lower portions of which contain passageways 30 having opposite lugs 32 at the entrances thereof. A like number of arm members are provided for cooperation with the blocks 28. Each of these arm members has a horizontal portion 34 and a vertical portion 36 connected by a neck 38 as best shown in Fig. 6, the cooperating block being shown in Fig. 5 detached from the arm member. The entrance slot 26 permits any desired number of arm members to be applied to the face plate 18 as will be understood from Fig. 3. It will be noted from Figs. 6 and 7 that the lower end of the arm portion 36 has an inwardly extending lug 40 whose upper surface is inclined to fit into the undercut circular groove 24 of the face plate 18. Spaced above the lug 40, the portion 36 is provided with a projection 42. It will be noted further that the inner end of the portion 34 is cut away at its upper surface to provide a projection 44 which when the arm member is pushed in radially, engages in a circular groove in the collar 20 as best shown in Fig. 2. When the arm members have been slid in through the entrance slot, they may be given circular movement so as to be properly spaced around the vertical axis of the device to correspond to the bolt holes around any make of wheel which is to be trued.

When the proper number of arm members have been applied to the face plate, the blocks 28 are applied to the arm members by sliding the lugs 32 down in the slots of the neck portions 38. The inner end of the arm member is held spaced upwardly from the face plate 18 by the projection 44 while the outer end of the arm member is held correspondingly spaced by the projection 42, as shown in Fig. 2. The arm portions 34 are provided with slots 46 of sufficient length to take care of bolt holes for any make of wheel. The blocks 28 when applied to the arm members are slid thereon to the proper inward position. The upper portion of each block above the passageway 30 is provided with holes 48, there being three of these holes shown for each block and extending in a radial line.

It will now be understood that the spacing of the arm portion 34 above the face plate 18 provides for the heads of bolts 50 and that these bolts may be moved inwardly and outwardly in the slots 46. When the bolts 50 are in outward position, it will be apparent that the blocks 28 may be applied with the bolts 50 extending up through any one of the three holes 48. The inner one of the holes 48 is counter sunk and at its upper portion enlarged as shown at 52 in Fig. 5, the adjacent upper surface of the block being cut down to a less depth as indicated at 54. For use in truing wheels which do not have flanges such as F shown in Fig. 8, filler members 56 shown in Fig. 4 are employed to even up the cut away portions 52 and 54. These filler members are shown in Fig. 2 in connection with a wheel W whose surface around the bolt holes is flat.

The manner of using the device in connection with wheels W shown in Fig. 2 will now be described. A plurality of bolts 50 extending up through the arm portions 34 and the blocks 28 having been arranged circumferentially to correspond to the bolt holes in the wheel, the latter is placed upon the blocks 28 with the bolts 50 extending up through the bolt holes of the wheel. In order to center the wheel, a center rod 58 extends downwardly with its lower end threaded to engage internal threads formed in the lower portion of the collar 20. In order to obtain proper centering of the wheel, a conical open center block 60 shown in dotted lines may be employed, this block being in the hub of the wheel and surrounding the rod 58 so that the coned surface of the block rests against the central opening of the wheel. Nuts 62 are now turned down upon the threaded upper ends of the bolts 50, the under surface of these nuts being coned to produce proper centering of the bolts 50. It will now be apparent that the wheel is firmly secured to the rotatable face plate 18 through the intermediary of the blocks and arm members. If desired the rod 58 and block 60 may now be removed to get them out of the way to permit riveting of the spokes of the wheel. Pressure is applied to the wheel at the proper places thereof to true and straighten it. This pressure may be applied by hydraulic jacks located at suitable places such as indicated at J in Fig. 2. The wheel may be spun from time to time to test its accuracy, the face plate resting upon the ball bearings permitting this to be readily done.

Fig. 8 shows how the device is used with wheels having flanges or projections F around the bolt holes. For such wheels the filler members 56 are removed so that the flanges may fit down into the cut away spaces provided in the upper portions of the blocks 28. Otherwise the procedure is the same as that previously described.

Fig. 11 shows how the device is adapted to securely hold wheels W of the disk type. For such purpose, I provide a spider-like device to be used in addition to the parts already described. The spider-like device consists of a collar 64 from which arms 66 extend out radially with clamping feet 68 slidably mounted on the arms. A sleeve 70 is placed on the rod 58 above the collar 64, and upon turning down a nut 62' on the upper threaded portion of the rod 58, the feet 68 will securely clamp the annular portion of the wheel disk outside of the bolt holes therein so that the disk is held in proper flat condition.

Fig. 10 shows how the device is adapted to hold brake drums and the like. For this purpose the blocks 28 and arm members 34—36 are not employed. Wedge members 72 are placed on top of the collar 20 so as to fit into the lower central portion of the drum D. With the drum thus in place, wedge members 74 are placed so as to fit into the upper central portion of the drum. An arm 63 attached to any suitable place may be engaged with the upper portion of the rod 58 to steady it. Upon now turning down the nut 62' on the upper threaded end of the rod 58, the drum will be securely held so that it can be trued, and tested for accuracy as desired by spinning the face plate by which the drum is carried.

The operation and advantages of my invention and the manner in which it may be used for truing various makes of wheels and drums have already been indicated. Although I have shown and described various specific embodiments of my invention, I am fully aware that other embodiments are possible. My invention, therefore, is not to be restricted except insofar as is necessitated by the prior art and by the spirit of the following claims.

I claim:

1. A device of the character described comprising a base member, a face plate rotatably mounted upon said base member, a plurality of arm members, means whereby said arm members may be attached around said face plate to correspond with the number and position of bolt holes in a wheel, a plurality of blocks, means for attaching said blocks respectively to said arm members, and means for securing the wheel to said blocks by utilizing said bolt holes.

2. A device of the character described comprising a base member, a face plate rotatably mounted upon said base member, a plurality of arm members, means whereby said arm members may be attached around said face plate to correspond with the number and position of bolt holes in a wheel, a plurality of blocks, means for adjustably attaching said blocks respectively to said arm members, bolts extending through said arm members and blocks, and nuts adapted to be screwed upon the screw-threaded ends of said bolts after the wheel has been placed upon said blocks with said bolts extending through said bolt holes.

3. A device of the character described comprising a base member, a face plate rotatably mounted upon said base member having a trackway around its periphery provided with an entrance opening, a plurality of arm members having projections adapted to pass through said opening, and to be engaged with said trackway whereby said arm members may be attached around said face plate to correspond with the number and position of bolt holes in a wheel, a plurality of blocks, means for adjustably attaching said blocks respectively to said arm members, bolts extending through said arm members and blocks, and nuts adapted to be screwed upon the screw-threaded ends of said bolts after the wheel has been placed upon said blocks with said bolts extending through said bolt holes.

4. A device of the character described comprising a base member, a face plate rotatably mounted upon said base member, a plurality of arm members having necks at their outer portions, means whereby said arm members may be attached around said face plate to correspond with the number and position of bolt holes in a wheel, a plurality of blocks having passageways in their lower portions, lugs at the entrance of said passageways whereby said blocks may be adjustably attached to said arm members respectively upon sliding said lugs along said necks, bolts extending through said arm members and blocks, and nuts adapted to be screwed upon the screw-threaded ends of said bolts after the wheel has been placed upon said blocks with said bolts extending through said bolt holes.

5. A device of the character described comprising a base member, a face plate rotatably mounted upon said base member, a plurality of blocks, means for adjustably attaching said blocks around said face plate whereby they may be made to correspond in number and position to the bolt holes of a wheel, said blocks containing holes adjacent which the surface of the blocks is cut away to receive flanges around said bolt holes, filler members for said cut away portions adapted to be used with wheels having unflanged bolt holes, bolts extending through the holes of said blocks, and nuts adapted to be screwed upon the screw-threaded ends of said bolts after the wheel has been placed upon said blocks with said bolts extending through said bolt holes.

NESTOR H. GUSTAFSON.